(12) United States Patent
van Zyl

(10) Patent No.: US 7,315,429 B2
(45) Date of Patent: Jan. 1, 2008

(54) APPARATUS, METHOD AND PROGRAM PRODUCT FOR A MULTI-CONTROLLER AND MULTI-ACTUATOR STORAGE DEVICE

(75) Inventor: Jacques M. J. van Zyl, Johannesburg (ZA)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 11/385,115

(22) Filed: Mar. 21, 2006

(65) Prior Publication Data

US 2007/0035868 A1 Feb. 15, 2007

(30) Foreign Application Priority Data

Jul. 28, 2005 (EP) .................................. 05106978

(51) Int. Cl.
*G11B 19/02* (2006.01)
*G11B 15/12* (2006.01)

(52) U.S. Cl. .............................. 360/69; 360/61; 710/62; 711/111

(58) Field of Classification Search ................ None
See application file for complete search history.

(56) References Cited

U.S. PATENT DOCUMENTS

| | | | |
|---|---|---|---|
| 5,293,282 A | | 3/1994 | Squires et al. |
| 5,343,347 A | * | 8/1994 | Gilovich .................. 360/246.7 |
| 5,355,486 A | * | 10/1994 | Cornaby ...................... 718/102 |
| 5,610,808 A | * | 3/1997 | Squires et al. ................. 700/2 |
| 6,057,990 A | * | 5/2000 | Gilovich .................. 360/246.7 |
| 6,449,130 B1 | | 9/2002 | Koyama |
| 6,483,659 B1 | * | 11/2002 | Kobayashi et al. ...... 360/78.04 |
| 6,563,657 B1 | | 5/2003 | Serrano et al. |
| 6,807,138 B1 | * | 10/2004 | Jamail et al. ............... 369/108 |

FOREIGN PATENT DOCUMENTS

| | | | |
|---|---|---|---|
| EP | 1074979 A2 | | 2/2001 |
| JP | 59-033608 | * | 2/1984 |
| JP | 59-81738 | * | 1/1986 |
| JP | 05-257613 | * | 10/1993 |

* cited by examiner

Primary Examiner—Andrew L. Sniezek
(74) Attorney, Agent, or Firm—Silvy Anna Murphy

(57) ABSTRACT

A data storage device, method and program product for high data transfer and access rate is disclosed. The data storage device includes a housing wherein at least one data storage disk is rotatably mounted. The housing further includes at least two actuator arm assemblies, each actuator arm assembly carrying a head for reading data from or writing data to the data storage disks. According to the invention the data storage device housing further includes a plurality of device interfaces, one device interface being associated to each of the actuator arm assemblies, and a common hard drive controller. Each of the plurality of device interfaces includes at least one hardware selection switch to configure the respective device interfaces for either read and write mode or read-only mode.

19 Claims, 3 Drawing Sheets

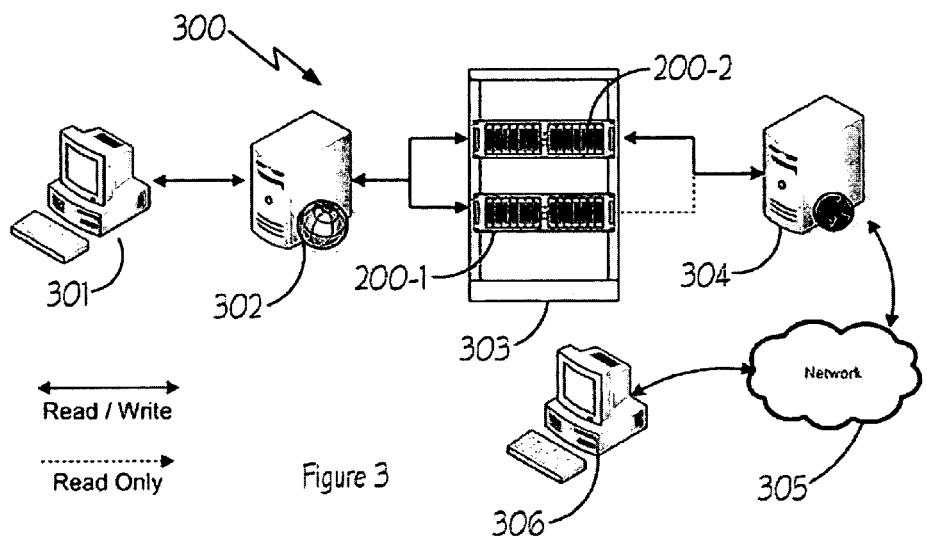
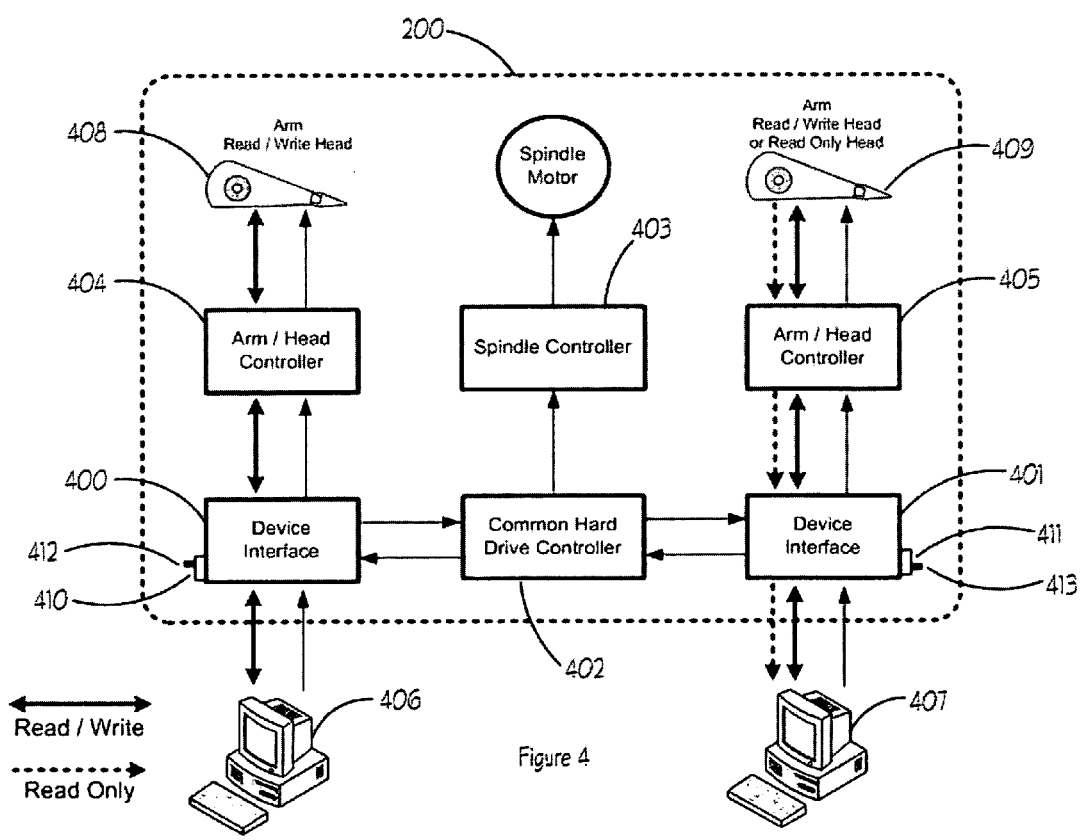

APPARATUS, METHOD AND PROGRAM PRODUCT FOR A MULTI-CONTROLLER AND MULTI-ACTUATOR STORAGE DEVICE

CROSS-REFERENCE TO RELATED APPLICATIONS

This application claims the priority benefit to and incorporates by reference European Patent Application No. EP05106978 "Multi-Controller and Multi-Actuator Storage Device" filed on Jul. 28, 2005 by International Business Machines Corporation.

FIELD OF THE INVENTION

The present invention relates generally to storage device and data access, and more specifically to a storage device comprising a plurality of controllers and actuators. Still more particularly, the present invention relates to a direct access and storage device with multiple controllers and actuators that can be operated independently, in parallel, or selectively actuated by the user.

BACKGROUND OF THE INVENTION

Generally, data access and storage systems consist of one or more storage devices that store data on magnetic or optical storage media. For example, a magnetic storage device is known as a direct access storage device (DASD) or a hard disk drive (HDD) and includes one or more disks and a disk controller to manage local operations concerning the disks. Disks are rigid platters that are usually made of aluminum alloy or a mixture of glass and ceramic, and are covered with a magnetic coating. Typically, two or three disks are stacked vertically on a common spindle that is turned by a disk drive motor at several thousand revolutions per minute (rpm).

The only other moving part within a typical HDD is the head stack assembly. Within most HDDs, one magnetic read/write head or slider is associated with each side of each platter and flies just above or below the platter's surface. Each read/write head is mounted on a suspension to form a head gimbal assembly (HGA). The HGA is then attached to a semi-rigid arm apparatus that supports the entire head flying unit. Several semi-rigid arms may be combined to form a single armature unit.

Each read/write head scans the surface of a disk during a "read" or "write" operation. The head and arm assembly is moved utilizing an actuator that is often a voice coil motor (VCM). The stator of a VCM is mounted to a base plate or casting on which the disk spindle is also mounted. The base casting is in turn mounted to a frame via a compliant suspension. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop directly over the desired track. The data on the spinning media is then read via a magnetic read sensor (typically magnetoresistive) on the read-write head.

As the storage capacity of DASDs continues to increase, a single disk drive enclosure may encounter many different kinds of applications. For example, a drive may be required to perform a very high throughput sequential operation, or a very high input/output rate random operation. Although there is no present manner of optimizing performance based upon any particular access characteristics, U.S. Pat. No. 5,293,282, discloses a disk drive with multiple actuators. The multiple actuators have multiple heads that read data from and write data to all tracks on the surfaces of the disks. The positioning of each head by respective actuators is controlled by embedded servo information recorded in the data tracks. Utilizing two actuators provides increased data transfer rates and reduced access times with respect to the access times provided by disk drives having a single actuator.

U.S. Pat. No. 6,563,657 discloses a hard disk drive for a computer system having at least two actuators for reading data from or writing data to the disks. The actuators may be configured to support the different methods of data access required of them. For example, if large quantities of sequential data are performed, one operation uses both actuators to increase throughput. However, if mostly random operations are to be performed, then independent usage of the actuators is preferred. These two methods of usage can be supported simultaneously, and can even be dictated by the user. The tracking format of the actuators can be configured such that the next logical track is physically located under a head on a different actuator to improve sequential operation. The actuators may also be utilized in a dual-channel configuration so that data can be written to both actuators at the same time, or read back at the same time to improve throughput. In addition, either of these configurations can be selected on a transfer-by-transfer basis by the user Referring to FIG. 1, a schematic drawing of an information storage system, such as a direct access and storage device (DASD), comprising a magnetic hard disk file or drive 100 for a computer system is shown. Drive 100 has an outer housing or base 101 containing a plurality of stacked, parallel magnetic disks 102 (four shown) which are closely spaced apart. Disks 102 are rotated in unison about a central drive hub 103 by a spindle motor (not shown) located there below.

Drive 100 is also provided with multiple actuators 104 (two shown). Although both actuators 104 are shown mounted to the common shaft of a single pivot cartridge assembly 105, actuators 104 may be independently mounted to base 101 on separate support structures. Each actuator 104 comprises a plurality of stacked, parallel actuator arms 106 (three shown) in the form of a comb that is pivotally mounted to base 101 about pivot cartridge assembly 105. A controller (not shown) is also mounted to base 101 for selectively moving the comb of arms 106 relative to disks 102.

Each arm 106 has extending from it one or two parallel, cantilevered load beams or suspensions 107, and a head gimbal assembly (HGA) 108 having at least one magnetic read/write head secured to each suspension 107 for magnetically reading data from or magnetically writing data to disks 102. Suspensions 107 have a spring-like quality which biases or maintains them in parallel relationship relative to one another. Motor voice coils 109 housed within respective dual magnet assemblies 110 are also mounted to the combs of arms 106 opposite head gimbal assemblies 108. Operation of the respective motor voice coils 109 is independently controlled. Movement of a motor voice coil 109 moves head gimbal assemblies 108 radially across tracks on the disks 102 until the heads on head gimbal assemblies 108 settle on the target tracks. A ramp 111 is provided near the perimeter of disks 102 for supporting head gimbal assemblies 108 while drive 100 is not in operation.

The operations of actuators 104 can be configured to support the different methods of data access required of them. For example, if large quantities of sequential data are performed, one operation uses both actuators 104 in parallel to increase throughput. However, if mostly random operations are to be performed, then independent usage of the actuators is preferred. These two methods of usage can be supported simultaneously, and can even be dictated on a selected basis by the user.

SUMMARY OF THE INVENTION

In one aspect of the invention, there is provided a data storage device that comprises a housing, at least one data storage disk rotatably mounted within the housing, at least a first actuator arm assembly and at least a second actuator arm assembly, the first actuator arm assembly and the second actuator arm assembly being coupled to the housing, with the first actuator arm assembly carrying a first head for at least reading data from the data storage disk, and with the second actuator arm assembly carrying a second head for at least reading data from the data storage disk, at least a first data storage device interface being associated with the first actuator arm assembly and at least a second data storage device interface being associated with the second actuator arm assembly, and a common hard drive controller. In a preferred embodiment, the first data storage device interface comprises at least a first hardware selection switch for configuring the first actuator arm assembly carrying the first head and the second data storage device interface comprises at least a second hardware selection switch for configuring the second actuator arm assembly carrying the second head. In one embodiment, the first head is a read and write head for reading data from and writing data to the data storage disk and the second head is a read only head for reading data from the data storage disk. The data storage device further comprises a plurality of interdependent data storage disks, where the first actuator arm assembly and the second actuator arm assembly are configured to carry as many arms and heads as the plurality of interdependent data storage disks. In one embodiment, the first data storage device interface is adapted to connect to an administrator server and wherein the second data storage device interface is adapted to connect to a network server. Further, in one embodiment, the plurality of interdependent data storage disks include at least one data storage disk having two sides from which data can be read from or on which data can be written to, and the first actuator arm assembly and the second actuator arm assembly comprise at least two heads. Further, in one embodiment, the administration server can read data from and write data to the first data storage device via the first data storage device interface and the network server can only read data from the second data storage device via the second data storage device interface.

In another aspect of the invention, there is provided a method of managing data. The method comprises providing a network data storage system having a housing and at least a first data storage device, the first data storage device including at least one data storage disk, at least a first head assembly for at least reading data from the data storage disk, at least a first data storage device interface associated with the first head assembly and configured for at least reading data from the data storage disk, a second head assembly for at least reading data from the data storage disk and at least a second data storage device interface associated with the second head assembly and configured for only reading data from the data storage disk. The method further comprises connecting at least a first computing device to the first device interface for exchanging data and transmitting commands to and from the first computing device and connecting at least a second computing device to the second device interface for accessing data and transmitting commands to and from the second computing device, establishing a plurality of parameters for a common drive controller coupled to each of the first device interface and the second device interface of the data storage device, and determining, using a logical state for one or more of the plurality of parameters, a current state of the data storage disk for which a data function request is received before executing the data function request in order to avoid a failure associated with the data storage disk. The method further comprises transmitting to the common drive controller the data function request that is received, such that a first head of the first head assembly associated with the first device interface does not use a same data storage disk address argument as a second head of the second head assembly associated with the second device interface. In one embodiment, the plurality of parameters for the common drive controller comprises a first parameter and a second parameter, and wherein the first parameter indicates whether or not the data storage disk is rotating, and the second parameter indicates whether or not a head associated with the data storage disk is in a secure position on the data storage disk. In a preferred embodiment, the first head assembly comprises a read-write head for both reading data from and writing data to the data storage disk, and the second head assembly comprises a read-only head for reading data from the data storage disk. In one embodiment, the first parameter is set to a first logical state if the data storage disk is rotating, wherein the first parameter is set to a second logical state if the data storage disk is not rotating, whereas the second parameter is set to a first logical state if the head associated with the data storage disk is not in the secure position on the data storage disk, and wherein the second parameter is set to a second logical state if the head is in the secure position on the data storage disk. In one embodiment, the determining step further comprises checking whether the first parameter is set to either the first logical state or the second logical state, and if the first parameter is not set to the first logical state, setting the first parameter to the first logical state for turning on a rotation of the data storage disk. In a preferred embodiment, the first data storage device interface is adapted to connect to an administration server that is configured to read data from and write data to the first data storage device and wherein the second data storage device interface is adapted to connect to a network server that can only read data from the second data storage device.

In yet another aspect of the invention, there is provided a computer program product for broadcasting data. The computer program product comprises a computer readable medium, first program instructions for exchanging data and transmitting commands to and from a data storage device having a first device interface set in a read and write mode for access by a user via the first device interface. The computer program product further comprises second program instructions for accessing data and transmitting commands to and from the data storage device having a second device interface set in a read-only mode for access by another user via the second device interface. The computer program product further comprises third program instructions to set a plurality of parameters for a common drive controller for controlling one or more heads associated with the data storage device, and fourth program instructions to determine a logical state of the first data storage device and the second data storage device before executing a data request command for broadcasting the data. In an embodiment, the fourth program instructions further include instructions to determine a current state of at least one data storage disk of either the first data storage device or the second data storage device for which a data function request is received before executing the data function request in order to avoid a failure associated with the data storage disk. In a preferred embodiment, the first, second and third program instructions are stored on the medium. Further, in an embodiment, the data stored in the first data storage device can be changed by a user at either the first server or the second server, whereas, the data stored in the second data storage device can be changed by the user at the first server and can only be read by the user from the second server. Furthermore, in an embodiment, the plurality of parameters for the common hard drive controller comprises a first parameter and a second parameter, where the first parameter indicates whether or not the data storage disk is rotating, and where the second parameter indicates whether or not a head associated with the data storage disk is in a secure position on the data storage disk. In one embodiment, the first parameter is set to a first logical state if the data storage disk is rotating, and where the first parameter is set to a second logical state if the data storage disk is not rotating. Further, the second parameter is set to a first logical state if the respective head is not in the secure position on the data storage disk, and where the second parameter is set to a second logical state if the respective head is in the secure position on the data storage disk.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 3 shows an example of a working environment of the information storage system when used as a network data storage, according to an embodiment of the invention.

FIG. 4 is a schematic representation of the logic controlling the information storage system, according to an embodiment of the invention.

BEST MODE FOR CARRYING OUT THE INVENTION

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the invention provides a data storage device or apparatus having a high throughput and adapted to handle huge amounts of data. The device comprises at least two head stack assemblies, preferably, one read/write head and one other read-only head, and at least two device interfaces, preferably as many device interfaces as head stack assemblies, so that a couple formed of a device interface and at least one head stack assembly can be used simultaneously with a second similar couple comprised of a second device interface and a second head stack assembly.

Figure 1:
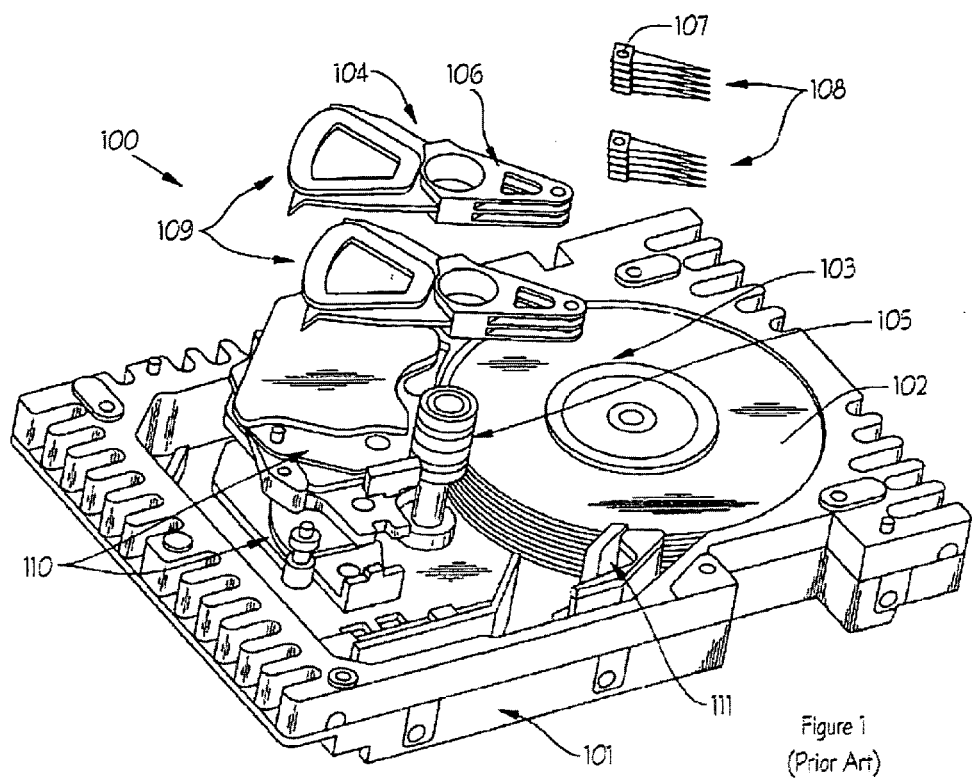
FIG. 1 illustrates an information storage system, such as a direct access and storage device (DASD), comprising a magnetic hard disk file or drive for a computer system, according to the prior art.
Figure 2:
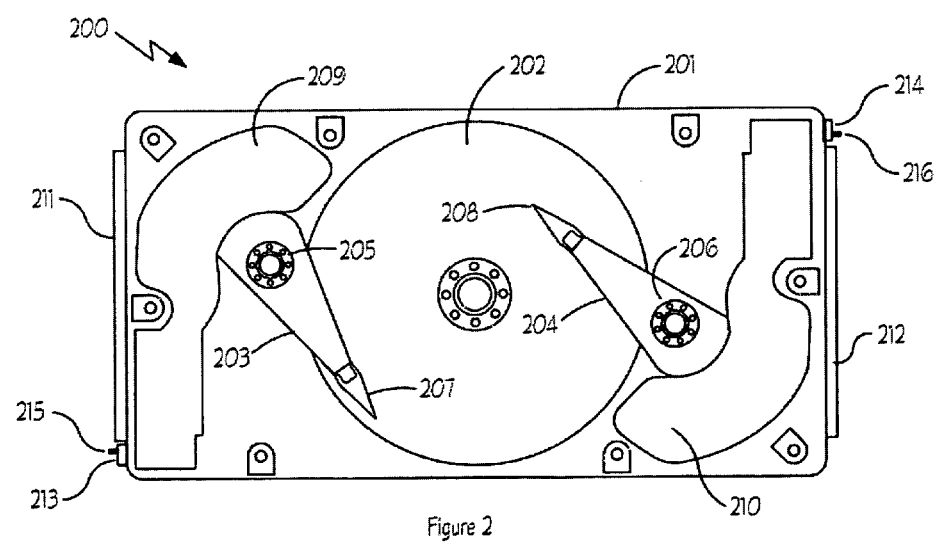
FIG. 2 depicts an example of an information storage system, according to the invention.

FIG. 2 depicts the data storage device 200 of the invention. As depicted, the device 200 comprises an outer housing 201 containing a plurality of stacked, parallel magnetic disks 202 (only the upper one is visible). Disks 202 are rotated in unison about a central drive hub by a spindle motor (not shown) located there below. Device 200 is also provided with multiple actuators, or actuator arm assemblies, 203 and 204. Although both actuators are shown mounted to the support structures 205 and 206, respectively, it should be understood that more than two actuators can be mounted in the device 200. Each actuator 203 and 204 comprises a plurality of stacked, parallel actuator arms in the form of a comb that is pivotally mounted to the outer housing or base 201 about pivot assemblies 205 and 206, respectively. Each arm of the actuators has extending from it one or two parallel, cantilevered load beams or suspensions, and a head gimbal assembly (HGA) 207 and 208 having at least one magnetic read/write head secured to each suspension for magnetically reading data from or magnetically writing data to disks 202. Each of the actuator arm assemblies 203 and 204 can be configured via respective hardware selection switches 213 and 214 on device 200 to enable either read and write capability (as shown by the upper position 215 of the hardware selection switch 213 or read-only capability (as shown by the lower position 216 of the hardware selection switch 214) of the respective read/write heads secured via the head gimbal assemblies 207 and 208 to the respective actuators 203 and 204. Although, the hardware selection switch 213 is shown in an upward position for read and write mode capability and the switch 214 is shown in a downward position for read-only mode, other configurations for a hardware selection switch will be apparent to one skilled in the art.

Preferably, the suspensions have a spring-like quality which biases or maintains them in parallel relationship relative to one another. Motor voice coils of actuators 203 and 204 housed within respective dual magnet assemblies 209 and 210, respectively, are mounted to the combs of actuator arms opposite head gimbal assemblies. Operation of the respective motor voice coils 209 and 210 is independently controlled. Movement of a motor voice coil moves head gimbal assemblies 207 and 208 radially across tracks on the disks 202 until the heads on head gimbal assemblies 207 and 208 settle on the target tracks. The data storage device 200 depicted in FIG. 2 comprises two device interfaces 211 and 212 so that a first computer system connected to the storage device 200 via device interface 211 can read or write data on disks 202 while a second computer system connected to the storage device 200 via device interface 212 can simultaneously read or write data on the same disks 202 (depending upon the configuration of the respective read/write heads based on the settings of the respective hardware selection switches 213 and 214).

The operations of actuators 203 and 204 can be configured to support the different methods of data access required of them via hardware selection switch, the method of data access depending upon the application in which the information storage system is used.

FIG. 3 illustrates a first example in which the information storage system of the invention is of particular benefit, for example, in video on demand or multimedia applications. As shown, the whole system 300 comprises an administrator terminal 301 connected to an administrator server 302. The administrator server 302 is connected to an external data storage unit 303 comprising a plurality of data storage devices, generically referred to as 200. The external storage unit 303 comprises as many data storage devices as required. In one embodiment, at least one of these data storage devices is of the type according to the invention. In another embodiment, for sake of illustration, both of the represented data storage devices 200-1 and 200-2 are of the type according to the invention. The administrator server 302 is connected to the first interface of the data storage devices 200-1 and 200-2. The second interface of the data storage devices 200-1 and 200-2 is connected to a network server 304, for example, a Web server, which is linked to a network 305, such as, the Internet, to which client computers are connected. In one embodiment shown, a client computer 306 is linked to the network server 304 via the network 305.

According to the system 300 and to the dual interfaces of the data storage devices 200-1 and 200-2, the administrator 301 and the user 306 can access the data storage devices 200-1 and 200-2 simultaneously.

A hard drive controller can be one of many different types, such as an Integrated Device Electronic (IDE), an Enhanced-IDE (E-IDE), a Serial Advanced Technology Attachment (SATA), a Small Computer System Interface (SCSI), an Ultra Wide SCSI, or a Fiber-Channel. According to a preferred embodiment, the hard drive interfaces of the system of the invention are preferably Ultra Wide SCSI or Fiber-Channel interfaces that allow higher data transfer rates.

The hard drive interfaces include sets of standards and specifications used for reliable communication between disk drives and a central processing unit which define an integrated bus interface between the disk drives and the central processing unit. For example, the SCSI connection between a host system and a peripheral device such as a hard disk may be based upon parallel cabling according to a client/server scheme. Typically, the client issues requests to read or write data to which a server responds according to commands from a logical unit, controller, or processor. Such commands are generally contained in a Command Descriptor Block (CDB) issued by the host system. For example, the command might be a command to read a specified number of data blocks at a specified address.

In a first embodiment, the heads of all the data storage devices of a preferred type of the invention are read and write heads so that the administrator 301 and the user 306 can read data from the data storage devices 200-1 and/or 200-2 and write data to the data storage devices 200-1 and/or 200-2.

In a second preferred embodiment, at least one head assembly of the data storage devices, for example, data storage device 200-1, linked to the second interface is a read only head assembly so that this data storage device 200-1 comprises data that can be updated only by the administrator 301. FIG. 3 illustrates the second embodiment as suggested by arrows connecting network server 304 to data storage devices 200-1 and 200-2. As shown, network server 304 can read data from or write data to data storage device 200-2, while network server 304 can only read data from data storage device 200-1. This makes it physically impossible for user 306 to alter or erase any of the data stored on data storage device 200-1, even if the security on network server 304 is compromised.

FIG. 4 is a scheme of the control and logic of the data storage device 200 according to the invention. As mentioned above, the data storage device of the invention comprises at least two device interfaces 400 and 401. In one embodiment as depicted in FIG. 4, device interface 400 is shown as having a hardware selection switch 410 that is set in an upward position 412 for enabling both read and write functions; whereas, device interface 401 is shown as having a hardware selection switch 411 that is set in a downward position 413 for enabling read-only functions on the data storage device 200. One of the interfaces, for example, interface 400, is adapted to be connected to, for example, an administrator computer 406, and the other of the interfaces, for example, interface 401, can be connected to the computer 407 of a user. The connection to a device interface comprises a data link for exchanging data and a control link for transmitting control commands such as instructions and addresses. Data exchanges are represented by bold arrows while control links are represented with normal arrows. As illustrated with dotted arrows, the data exchange can be a one way data exchange if the head to which the device interface is connected is a read only head. Device interfaces 400 and 401 are linked to a common hard drive controller 402 that is connected to a spindle controller 403 for managing the rotation of the disk(s). Since the rotational speed of the disks is constant when data is read from or written to the disk(s), it is independent of the head operations. Each device interface 400 and 401 is also connected to an arm and head controller 404 and 405, respectively. The arm and head controllers 404 and 405 control the position of arms and of the heads as well as the operation of the heads. As mentioned above, the heads can be either read and write heads or read only heads. However, depending on the configuration setting of the respective hardware selection switches 410 and 411 of either upward 412 or downward 413, the respective read/write heads that are secured to the respective actuator arm assemblies 408 and 409 via their respective head gimbal assemblies are configured to either read and write data on the data storage device 200 or to only read data from the data storage device 200.

Preferably, the rotational speed of the disks is constant when data is read from or written to the disks therefore, preferably, the only relation between the at least two subsystems comprising device interface and arm/head controller lies in the on/off selection of disk rotation. However, since the heads are flying on an air bearing, a cushion of air, created by the rotation of the disks, only nanometers above the disk surface, it is important to position the heads to a safe area of the disks where no data is ever kept, also called the landing zone or parking zone, or to immobilize them on ramps, so as to avoid friction with the disk surface or a head crash that would lead to a failure of the disks in which the heads scrape across the platter surface, often grinding away the thin magnetic film. As a consequence, the device interface preferably determines the state of the disks before turning them on or off. In a preferred embodiment, this is done with a plurality of parameters of the common hard drive controller 402. A first parameter is set to a first logical state if the disks are rotating and in a second logical state if the disks are stopped. A second parameter, associated to each device interface, is used to determine the state of the interface; when data is read or written, that is, when the corresponding head is not in a secure position, the parameter is set to a first logical state, while when data is not read nor written, that is, when the corresponding head is in its secure position, the parameter is set to a second logical state. As a consequence, the disks can be stopped only if all the values of the second parameters are set to the second logical state. Before reading or writing data, the device interface checks if the first parameter is set to the first logical state, if it is not, the rotation of the disks is turned on and the first parameter is set to the first logical value, and the second parameter of the corresponding device interface is set to the first logical value.

Still in a preferred embodiment, the common hard drive controller is also used to improve address management so that a write function performed by a read/write head does not use the same disk address argument as a read or write function performed by another read or read/write head. To that end, the read and write functions received by the device interfaces are transmitted to the common hard drive controller that checks if they are conflicting with previously received read or write functions received from other device interfaces. Depending upon set-up and priorities, the execution of the last received function can be delayed or the address where the data is to be written can be modified. For example, if the common hard drive controller 402 receives a first write or read function having a base address Addr1 and a data block size S1 and then a second write function having a base address Addr2 and a data block size S2, the execution of the second function can be delayed, or the base address Addr2 can be modified if, Addr2∈[Addr1;Addr1+S1]

or if,

Addr1∈[Addr2;Addr2+S2]

so that the second write request falls outside the range being updated by the first function request.

To increase the storage capacity, the data storage device of the invention comprises more than one data storage disk. They are preferably interdependent and mounted on the same axis. Still in a preferred embodiment, the data storage disks comprise two sides from which data can be read or on which data can be written. To read data from and write data to the data storage disks, the actuator arm assemblies comprise as many arms and heads as data storage disks, and twice the number of arms and heads as data storage disks if the disks comprise two sides from which data can be read from or on which data can be written to. The arms of each actuator arm assembly can be either interdependent or independent depending upon how data is written on the data storage disks.

As mentioned above, the present invention provides a method for managing data in an information storage system 300, such as, in video on demand or multimedia applications. Referring to FIGS. 2 and 3, the method comprises providing a data storage device 200 (FIG. 2), preferably, a network data storage system 303 (FIG. 3) having a housing and at least a first data storage device 200-2, which includes at least one data storage disk 202 (FIG. 2), at least a first head assembly or actuator arm assembly 203 for at least reading data from the data storage disk 202 and at least a first data storage device interface 211 associated with the first head assembly 203, the first data storage device 200-2 being configured to at least read data from the data storage disk 202. In a network data storage system embodiment, the network data storage system housing further comprises a second head assembly 204 for at least reading data from the data storage disk 202 and at least a second data storage device interface 212 associated with the second head assembly 204, the second data storage device interface 212 being configured to only read data from the data storage disk 202. The method further comprises connecting at least a first computing device 302 (FIG. 3) to the first device interface 211 for exchanging data and transmitting commands to and from the first computing device 302 and connecting at least a second computing device 304 to the second device interface 212 for accessing data and transmitting commands to and from the second computing device 304. In one embodiment, each of the first and second device interfaces 211 and 212 comprises a hardware selection switch, which can be configured to operate either in a read and write mode or in a read-only mode. Preferably, the configuration of the respective device interfaces 211 and 212 is accomplished in a physical manner, for instance, by setting each of the respective hardware selection switches 213 and 214 on the data storage device 200 through a dip switch or a jumper. Depending on the configuration set on the respective hardware selection switches 213 and 214, the respective read/write heads that are secured to the respective actuator arm assemblies 203 and 204 via the respective head gimbal assemblies 207 and 208 are configured to either read and write data, that is, exchange data on the data storage disk 202 or to only read data, that is, only access data from the data storage disk 202. Accordingly, the manual setting of the hardware selection switch, for instance, on device interface 212, minimizes the risk of changing the ability to write to the storage device 200 through a read/write configured head when the security of a computing device or system that is connected to the storage device via the configured device interface 212 is compromised.

Referring to FIGS. 3 and 4, FIG. 3 shows the method with computing devices 302 and 304 connected to a network storage device or system 303, whereas, FIG. 4 shows the method with computing devices 406 and 407 connected to a data storage device 200. In both examples, the method comprises establishing a plurality of parameters for a common hard drive controller 402, which in FIG. 4 is shown as being coupled to both a first device interface 400 and a second device interface 401 of the data storage device 200. As will be explained with respect to FIG. 5, the method comprises determining, using a logical state of one or more of the plurality of parameters, a current state of a data storage disk, for instance, data storage disk 202 in FIG. 2, for which a data function request is received before executing the data function request in order to avoid a disk failure associated with the data storage disk. The method further comprises transmitting to the common drive controller 402 the data function request that is received, such that a first head on the actuator arm assembly or head assembly 408 that is associated with the first device interface 400 does not use a same data storage disk address argument as a second head on the actuator arm assembly 409 that is associated with the second device interface 401. In one embodiment, the first head assembly 408 comprises a read-write head for both reading data from and writing data to the data storage disk, whereas, the second head assembly 409 comprises a read-only head for reading data from the data storage disk. The plurality of parameters for the common drive controller 402 comprises a first parameter and a second parameter. The first parameter indicates whether or not the data storage disk is rotating, and the second parameter indicates whether or not a head associated with the data storage disk is in a secure position on the data storage disk.

Figure 5:
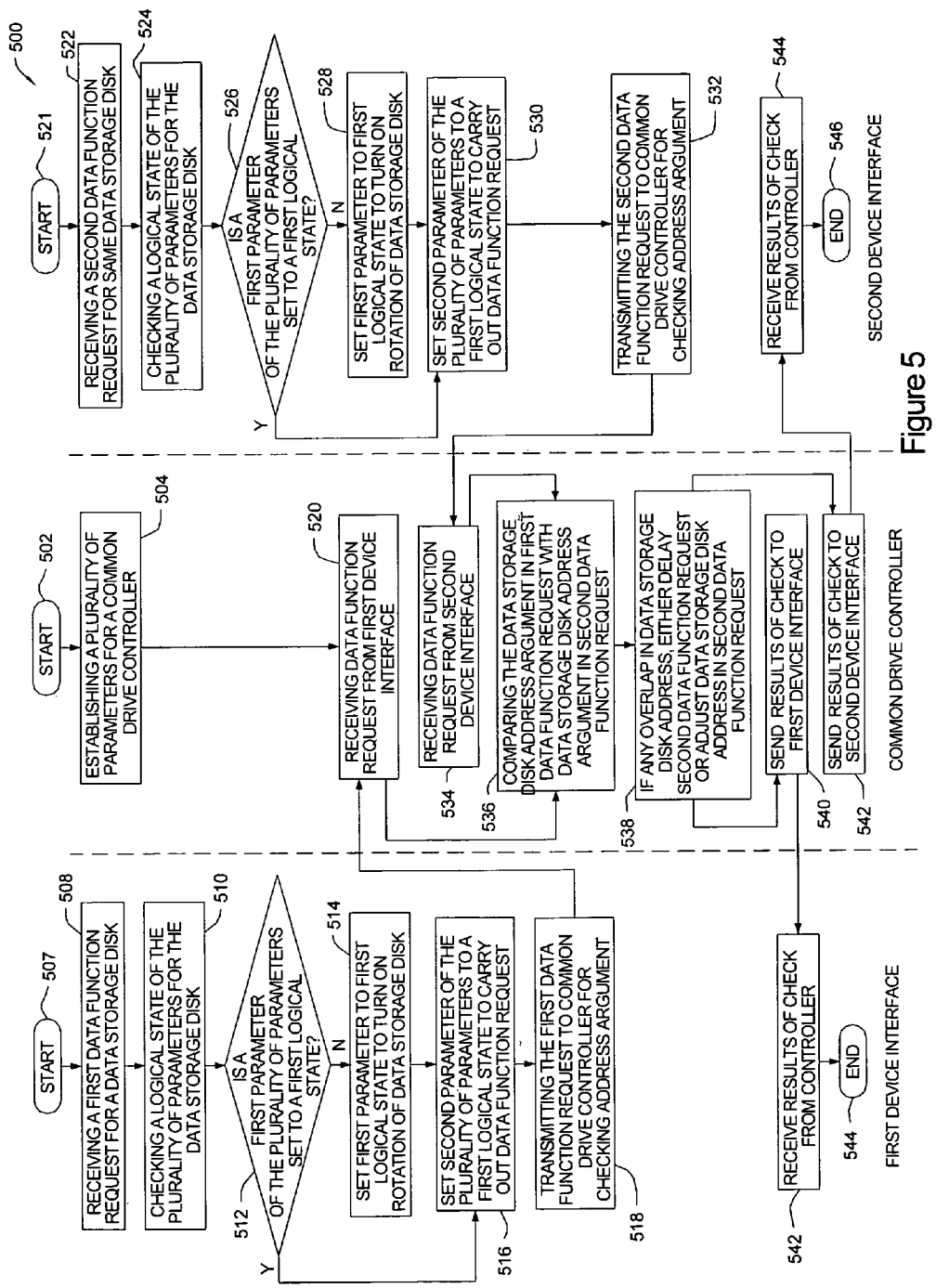
FIG. 5 is an illustration of a flowchart depicting a method for managing data on a data storage device, according to an embodiment of the invention.

Referring to FIG. 5, the method of managing data 500 starts in step 502 with establishing in step 504 a plurality of parameters for the common hard drive controller 402 (shown in FIG. 4). Preferably, the first parameter is set to a first logical state if the data storage disk 202 (FIG. 2) is rotating, whereas, the first parameter is set to a second logical state if the data storage disk is not rotating. In one embodiment, the second parameter is set to a first logical state if the head associated with the data storage disk is not in a secure position on the data storage disk, whereas, the second parameter is set to a second logical state if the head associated with the data storage disk is in the secure position on the data storage disk. Further, as shown in FIG. 5, starting at step 507 when the first device interface 400 receives in step 508 a first data function request for the data storage disk, the first device interface 400 checks a logical state of the first and second parameters to determine a current state of the data storage disk for which a data function request is received in step 508 before executing the data function request in order to avoid a disk failure associated with the data storage disk. As shown in FIG. 5, the first device interface 400 determines the current state by checking in step 512 whether the first parameter is set to either the first logical state or the second logical state, and if the first parameter is not set to the first logical state in step 512, setting the first parameter to the first logical state in step 514 for turning on rotation of the data storage disk. Further, if the first parameter is set to the first logical state in step 512 or after step 514, the second parameter of the plurality of parameters is set to a first logical state to carry out the data function request in step 516. The method further comprises transmitting in step 518 to the common drive controller 402 the first data function request that is received, such that a first head of the first head assembly 408 that is associated with the first device interface 400 does not use a same data storage disk address argument as a second head of the second head assembly 409 that is associated with the second device interface 401. Similarly, the process starts in step 521, when the second device interface 401 receives in step 522 a second data function request for the data storage disk 202, the second device interface 401 checks a logical state of the first and second parameters to determine a current state of the data storage disk for which the second data function request is received in step 522 before executing the data function request in order to avoid a disk failure associated with the data storage disk. As shown in FIG. 5, the second device interface 401 determines the current state by checking in step 524 whether the first parameter is set to either the first logical state or the second logical state, and if the first parameter is not set to the first logical state in step 526, setting the first parameter to the first logical state in step 528 for turning on a rotation of the data storage disk 202. Further, if the first parameter is set to the first logical state in step 526 or after step 528, the second parameter of the plurality of parameters is set to a first logical state to carry out the data function request in step 530. The method further comprises transmitting in step 532 to the common drive controller 402 the second data function request that is received, such that a second head of the second head assembly 409 associated with the second device interface 401 does not use the same data storage disk address argument as the first head of the first head assembly 408 associated with the first device interface 400. The common hard drive controller 402 receives the data function request from the first device interface in step 520 and from the second device interface in step 534. The common hard drive controller 402 compares the data storage disk address argument in the first data function request with the data storage disk address argument in the second data function request in step 536. If in step 538, the common hard drive controller 402 determines that there is an overlap in the respective data storage disk address arguments, the common hard drive controller 402 can either delay the execution of the second data request or can adjust the data storage disk address in the second data function request to avoid any disk failure. The common hard drive controller sends the results of the check to the first device interface in step 540, which is received by the first device interface 400 in step 542, ending in step 544. Further, the common hard drive controller sends the results of the check to the second device interface in step 542, which is received by the second device interface 401 in step 544, ending in step 546. In one embodiment as shown in FIGS. 3 and 4, the first data storage device interface 400 is adapted to connect to an administrator 301 or 406 via an administration server or computing device 302 that is configured to read data from and write data to the first data storage device 200-2, and where the second data storage device interface 401 is adapted to connect to a user 306 or 407 via a network server or computing device 304 that can only read data from the second data storage device 200-1.

The invention also provides a computer program product for broadcasting data stored in an information storage system. The computer program product comprises a computer readable medium, first program instructions for exchanging data and transmitting commands to and from a data storage device 200 (shown in FIG. 4) having a first device interface 400 set in a read and write mode (by setting the hardware selection switch 410 to one position 412) for access by a user 406 via the first device interface 400. The computer program product comprises second program instructions for accessing data and transmitting commands to and from the data storage device 200 having a second device interface 401 set in a read-only mode (by setting the hardware selection switch 411 to another position 413) for access by a user 407 via the second device interface 401. In one embodiment, the data stored in the data storage device 200 can be changed by the user 406 connected to the storage device 200 via the device interface 400, whereas, the data stored in the data storage device 200 cannot be changed by a user 407 connected to the storage device 200 via the device interface 401, but rather the user 407 can only read data or access data stored on the storage device 200 given that the hardware selection switch 411 is set to a read-only mode. The computer program product further comprises third program instructions to set a plurality of parameters for a common drive controller for controlling one or more heads associated with the first data storage device and the second data storage device, respectively. Preferably, the plurality of parameters for the common hard drive controller include a first parameter and a second parameter, and wherein the first parameter indicates whether or not the data storage disk is rotating, and wherein the second parameter indicates whether or not a head associated with the data storage disk is in a secure position on the data storage disk. Further, the computer program product comprises fourth program instructions to determine a logical state of the first data storage device and the second data storage device before executing a data request command for broadcasting the data. Preferably, the fourth program instructions further include instructions to determine a current state of the data storage disk of either the first data storage device or the second data storage device for which a data function request is received before executing the data function request in order to avoid a failure associated with the data storage disk. The first parameter is set to a first logical state if the data storage disk is rotating; whereas the first parameter is set to a second logical state if the data storage disk is not rotating. Further, in one embodiment, the second parameter is set to a first logical state if the respective head is not in the secure position on the data storage disk, and wherein the second parameter is set to a second logical state if the respective head is in the secure position on the data storage disk. Preferably, the first, second, third and fourth program instructions are stored on the medium.

In a preferred embodiment, the computer readable medium comprises both a computer storage medium and a network medium. Preferably, the computer storage medium includes semiconductor memory, magnetic disk, magnetic tape, compact disc (CD), read-only memory (ROM), and/or digital video disc (DVD) and the network medium comprises transmission devices on a network, such as, cables, routers, switches and/or network adapter cards. Accordingly, the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general purpose microprocessor, the computer program code segments configure the microprocessor to create specific logic circuits. One skilled in the art would appreciate that a set of programmable instructions executed by a processor of the system are required for performing the process steps of the inventive system and method described above.

Preferably, the computer program product is in a form accessible from the computer-usable or computer-readable medium, which provides program codes or instructions for use by or in connection with a computer or any instruction execution system. For the purposes of this description, a computer-usable or computer readable medium can be any apparatus that can contain, store, communicate, propagate, or transport the codes or instructions for use by or in connection with the instruction execution system, apparatus, or device. Preferably, the medium can comprise an electronic, magnetic, optical, electromagnetic, infrared, or semiconductor system (or apparatus or device) or a propagation medium. More preferably, the computer-readable medium can comprise a semiconductor or solid state memory, magnetic tape, a removable computer diskette, a random access memory (RAM), a read-only memory (ROM), a rigid magnetic disk and an optical disk. Further, examples of optical disks include compact disc—read only memory (CD-ROM), compact disc—read/write (CD-R/W) and digital versatile/video disc (DVD). Further, preferably, network medium can comprise of transmission devices on a network, such as, cables, routers, switches and/or network adapter cards.

Accordingly, the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general purpose microprocessor, the computer program code segments configure the microprocessor to create specific logic circuits. One skilled in the art can appreciate that a set of programmable instructions executed by a processor of the system are required for performing the process steps of the inventive system and method described above.

As mentioned above, a specific application of the data storage device of the invention concerns methods of multimedia on demand and audio/video broadcasting. In such applications, a network data storage comprises a plurality of data storage devices according to the invention. At least one data storage device is set in read and write mode for both the administrator server and the network server so that users' profiles, login identifiers and passwords can be updated by service provider and users. This data storage device can be one according to the invention or not if the amount of data being transferred is relatively low. One or more data storage devices are used to store the content to be broadcasted and so, these data storage devices can be accessed in read and write mode by the service provider to update their contents while users can only access the stored data in read mode, preventing unauthorized changes to the content. The use of data storage devices according to the invention allows high data transfer and access rates, and a simultaneous data broadcasting and updating of data while maintaining strict security on the content.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A data storage device comprising:
   a housing;
   at least one data storage disk rotatably mounted within said housing;
   at least a first actuator arm assembly and at least a second actuator arm assembly, said at least first actuator arm assembly and said at least second actuator arm assembly being coupled to said housing, said at least first actuator arm assembly carrying a first head for at least reading data from said at least one data storage disk, said at least second actuator arm assembly carrying a second head for at least reading data from said at least one data storage disk;
   at least a first data storage device interface associated with said at least first actuator arm assembly and at least a second data storage device interface associated with said at least second actuator arm assembly; and
   a common hard drive controller, and wherein said first data storage device interface comprises at least a first hardware selection switch for configuring said at least first actuator arm assembly carrying said first head, and wherein said second data storage device interface comprises at least a second hardware selection switch for configuring said at least second actuator arm assembly carrying said second head.

2. The data storage device according to claim 1, wherein said first head is a read and write head for reading data from and writing data to said at least one data storage disk, and wherein said second head is a read only head for reading data from said at least one data storage disk.

3. The data storage device according to claim 2, further comprising:
   a plurality of interdependent data storage disks, wherein said at least first actuator arm assembly and said at least second actuator arm assembly are configured to carry as many arms and heads as said plurality of interdependent data storage disks.

4. The data storage device according to claim 3, wherein said plurality of interdependent data storage disks include at least one data storage disk having two sides from which data can be read from or on which data can be written to, and wherein said at least first actuator arm assembly and said at least second actuator arm assembly comprise at least two heads.

5. The data storage device according to claim 4, wherein said administration server can read data from and write data to said at least first data storage device via said at least first data storage device interface.

6. The data storage device according to claim 4, wherein said network server can only read data from said at least second data storage device via said at least second data storage device interface.

7. The data storage device according to claim 2, wherein said at least first data storage device interface is adapted to connect to an administrator server and wherein said at least second data storage device interface is adapted to connect to a network server.

8. A method of managing data, said method comprising the steps of:
providing a network data storage system having a housing and at least a first data storage device, said first data storage device including at least one data storage disk, at least a first head assembly for at least reading data from said at least one data storage disk, at least a first data storage device interface associated with said at least first head assembly and configured for at least reading data from said at least one data storage disk, a second head assembly for at least reading data from said at least one data storage disk and at least a second data storage device interface associated with said second head assembly and configured for only reading data from said at least one data storage disk;
connecting at least a first computing device to said at least first device interface for exchanging data and transmitting commands to and from said first computing device and connecting at least a second computing device to said at least second device interface for accessing data and transmitting commands to and from said at least second computing device;
establishing a plurality of parameters for a common drive controller coupled to each of said at least first device interface and said at least second device interface of said data storage device; and
determining, using a logical state for one or more of said plurality of parameters, a current state of said at least one data storage disk for which a data function request is received before executing said data function request in order to avoid a failure associated with said at least one data storage disk.

9. The method according to claim 8, further comprising the step of:
transmitting to said common drive controller said data function request that is received, such that a first head of said at least first head assembly associated with said at least first device interface does not use a same data storage disk address argument as a second head of said second head assembly associated with said second device interface.

10. The method according to claim 8, wherein said plurality of parameters for said common drive controller comprises a first parameter and a second parameter, and wherein said first parameter indicates whether or not said at least one data storage disk is rotating, and wherein said second parameter indicates whether or not a head associated with said at least one data storage disk is in a secure position on said at least one data storage disk.

11. The method according to claim 10, wherein said first parameter is set to a first logical state if said at least one data storage disk is rotating; wherein said first parameter is set to a second logical state if said at least one data storage disk is not rotating, wherein said second parameter is set to a first logical state if said head associated with said at least one data storage disk is not in said secure position on said at least one data storage disk, and wherein said second parameter is set to a second logical state if said head is in said secure position on said at least one data storage disk.

12. The method of claim 8, wherein said at least first head assembly comprises a read-write head for both reading data from and writing data to said at least one data storage disk, and said at least second head assembly comprises a read-only head for reading data from said at least one data storage disk.

13. The method according to claim 12, wherein said determining step further comprises the steps of:
checking whether said first parameter is set to either said first logical state or said second logical state; and
if said first parameter is not set to said first logical state, setting said first parameter to said first logical state for turning on a rotation of said at least one data storage disk.

14. The method according to claim 13, wherein said at least first data storage device interface is adapted to connect to an administration server that is configured to read data from and write data to said at least first data storage device and wherein said at least second data storage device interface is adapted to connect to a network server that can only read data from said at least second data storage device.

15. A computer program product for broadcasting data, said computer program product comprising:
a computer readable medium;
first program instructions for exchanging data and transmitting commands to and from a data storage device having a first device interface set in a read and write mode for access by a user via said first device interface;
second program instructions for accessing data and transmitting commands to and from said data storage device having a second device interface set in a read-only mode for access by another user via said second device interface;
third program instructions to set a plurality of parameters for a common drive controller for controlling one or more heads associated with said data storage device;
fourth program instructions to determine a logical state of said data storage device before executing a data request command for broadcasting said data; and wherein said first, second, third and fourth program instructions are stored on said medium.

16. The computer program product according to claim 15, wherein said data stored in said first data storage device can be changed by said user connected via said first device interface, and wherein said data stored in said data storage device cannot be changed by said another user connected via said second device interface.

17. The computer program product according to claim 16, wherein said fourth program instructions further include instructions to determine a current state of at least one data storage disk on said data storage device for which a data function request is received before executing said data function request in order to avoid a failure associated with said at least one data storage disk.

18. The computer program product according to claim 17, wherein said plurality of parameters for said common hard drive controller comprises a first parameter and a second parameter, and wherein said first parameter indicates whether or not said at least one data storage disk is rotating, and wherein said second parameter indicates whether or not a head associated with said at least one data storage disk is in a secure position on said at least one data storage disk.

19. The computer program product according to claim 18, wherein said first parameter is set to a first logical state if said at least one data storage disk is rotating; wherein said first parameter is set to a second logical state if said at least one data storage disk is not rotating, wherein said second parameter is set to a first logical state if said respective head is not in said secure position on said at least one data storage disk, and wherein said second parameter is set to a second logical state if said respective head is in said secure position on said at least one data storage disk.

* * * * *